United States Patent [19]

Rumsey

[11] 4,052,134
[45] Oct. 4, 1977

[54] VERTICAL AXIS WIND TURBINE MOTOR

[76] Inventor: Rollin Douglas Rumsey, 148 Summer St., Buffalo, N.Y. 14222

[21] Appl. No.: 649,257

[22] Filed: Jan. 15, 1976

[51] Int. Cl.² ............................................. F03D 7/06
[52] U.S. Cl. .................................... 416/119; 416/140
[58] Field of Search ............... 416/108, 109, 111, 119, 416/41, 132 B, 106, 107, 140, DIG. 4, DIG. 6

[56] References Cited

U.S. PATENT DOCUMENTS

| 419,024 | 1/1890 | Straw | 416/139 X |
|---|---|---|---|
| 1,190,629 | 7/1916 | Clade | 416/108 |
| 1,430,406 | 9/1922 | Schulthes et al. | 416/119 |
| 1,639,908 | 8/1927 | Strandgren | 416/109 |
| 1,753,252 | 4/1930 | Strandgren | 416/108 |
| 1,885,640 | 11/1932 | Strandgren | 416/108 |
| 2,044,794 | 6/1936 | Kisevalter | 416/118 |
| 3,382,931 | 5/1968 | Pontcarral et al. | 416/116 X |
| 3,877,836 | 4/1975 | Tompkins | 416/119 |

FOREIGN PATENT DOCUMENTS

| 530,231 | 12/1921 | France | 416/135 |
|---|---|---|---|
| 860,930 | 12/1952 | Germany | 416/108 |
| 296,736 | 9/1928 | United Kingdom | 416/108 |
| 301,091 | 11/1928 | United Kingdom | 416/119 |
| 319,963 | 10/1929 | United Kingdom | 416/116 |
| 150,066 | 5/1962 | U.S.S.R. | 416/41 |

*Primary Examiner*—Everette A. Powell, Jr.
*Attorney, Agent, or Firm*—Hill, Gross, Simpson, Van Santen, Steadman, Chiara & Simpson

[57] ABSTRACT

A wind power conversion turbine motor has a body supported to rotate about a vertical axis and carrying a plurality of substantially upright vanes substantially spaced from the vertical axis and circumferentially spaced from one another so that wind thrusting propulsively against outer sides of the vanes can move across the space circumscribed by the vanes and thrust propulsively against inner sides of the vanes on leaving the space, thereby attaining dual power advantage from substantially all wind that strikes the turbine. Each of the plurality of vanes is pivotally carried on the body, with a control means to maintain a substantially constant vane angle of attack to a relative wind vector.

28 Claims, 25 Drawing Figures

| POSITION | RESULTANT | RAD. (r) | TORQ.(+) | TORQ.(−) |
|---|---|---|---|---|
| A | −22 K | 9.5 | | −214 |
| B | 710 K | 1.2 | 850 | |
| C | 820 K | 3.2 | 2720 | |
| D | 250 K | 1.12 | 280 | |
| E | −2.5 K | 9.5 | | −24 |
| F | −55 K | 7.1 | | −390 |
| G | 820 K | 3.2 | 2720 | |
| H | 390 K | 2.9 | 1130 | |
| | | | +7700 K | − 628 K = +6072 K |

K = CONSTANT
= ½ PS
P = AIR DENSITY
S = AREA OF VANE FT²

VERTICAL AXIS WIND TURBINE MOTOR

BACKGROUND OF THE INVENTION

Kinetic energy inherent in the earth's atmosphere, in the form of wind power, has long been utilized to perform useful work. Power is extracted from horizontal air movements by windmills and the like employing blades or vanes rotatable about a horizontal axis and arranged to intercept the wind to develop sufficient torque to drive small pumps, generate electrical power at limited levels or drive small mills. Past windmills, however, have been inefficient and capable of developing only limited power.

More recently, several large tower mounted units have been built and tested with a somewhat improved efficiency but at a substantial cost when considering the energy produced as compared with other power generating means. Further, these large units require heavy, bulky towers and bracing and require complex drive and feathering means for high wind velocity protection. A complicated yaw mechanism, to bring the rotatable blades into a favorable position relative to the wind direction, is also needed.

Research has also been conducted to develop a wind turbine with three intricate aircraft-type rotor blades formed in a catenary shape for rotation about a vertical axis. Therein, much of the blade's efficiency is lost because both blade ends are mounted for rotation about the axis with little power developed remote from the catenary centers.

SUMMARY OF THE INVENTION

The present invention provides large turbine motors utilizing the wind in the earth's atmosphere to rotate the turbine motor body about a vertical axis. The body carries a plurality of pivotally mounted upright airfoil blades or vanes arranged in a uniform circumferentially spaced relationship relative to one another, about the periphery of the body, providing gaps or spaces therebetween which allows a portion of the wind's air mass to penetrate between the vanes and sweep through an open center area circumscribed by the vanes and into the vicinity of the vanes diametrically across the turbine motor. Herein, a first surface of the vanes of the wind turbine intercepts a mass of air approaching at a given velocity while adjacent air masses move at a constant velocity past the vanes through the open center area and are intercepted by a second surface of the vanes which vanes are located on the opposite side of the body. The intercepted air decelerates in transferring energy to the vanes producing a rotational force to drive the wind turbine motor about its axis.

Thus, each vane, in making one complete revolution about the axis, will present a pair of intercepting surfaces to the wind in which two positive thrust pulses of energy are accepted by the vane from the oncoming air stream to rotate the turbine motor at circumferential speeds of up to three times the wind speed.

Each vane, at a given point in its rotational movement, imparts a certain torque on the body of the turbine motor in direct proportion to its orientation relative to the wind direction. The force of the torque is continually fluctuating in accordance with the rotational position of the vane. It will be obvious that some of the torque forces will be of a negative value and act on the body in a reverse direction, however, the vanes responsible for these negative values are minimal in the present invention, wherein a resultant of all the forces developed by each of the vanes produce a substantial torque in a driving direction. The negative or counter-torque forces were found to be less than 10% of the total torque produced by the vanes.

It is obvious that large units are necessary to develop practical amounts of power with the means to absorb the energy produced, being able to operate over an extreme power range. A reentry "drag" turbine pump, which may be used to heat water, is well-suited to absorb the energy produced by the turbine motor, but other applications are also considered to be practical to convert the wind energy into mechanical or electrical power as well.

Preferably, the vane chords (a straight line joining the trailing and leading edges of the vane) are approximately 1/5 of the radius of the rotation and the vanes are spaced a minimum of one chord apart. This is generally the maximum number of vanes that can be used without encountering interblade interference (blanketing) and provides the highest overall torque. At higher rotational (peripheral) velocities, such as 2 to 3 times greater than the wind velocity, the vanes should be spaced 3 to 10 chords apart. The number of vanes used essentially establishes the optimum speed for maximum power and minimum interference.

Each of the vanes used with the present invention is swivelable through 360° with a spring provided to urge the vanes into a tangential position relative to its orbital path (perpendicular to the radius). The vanes are thereby automatically feathered or allowed to turn on their axes responsive to excessive wind velocities to trim their wind intercepting angle and diminish the wind forces acting on the vanes. This provides a limiting control of the rotational speeds and prevents structural damage to the turbine motor in gale winds or if the turbine motor were stalled by overloads or jamming.

Since the rotational movement of the vertical axis turbine motor is along a horizontal plane which may be conveniently ground-supported, a rugged, simplified and economical structure may be employed and, accordingly, these units can be constructed to a considerably larger size than heretofore possible with prior horizontal axis wind driven propeller engine designs. Further, extremely large versions of the invention may be rotatably supported on a body of water to provide a broad, minimum friction means of support.

An important object of the present invention is to overcome the disadvantages, deficiencies, inefficiencies and problems encountered with the prior windmills and not only to improve the torque generating efficiency of such units, but also to make possible the construction of very large units which could not practically be tower-supported.

Another object of the invention is to provide a vertical rotational axis turbine motor which is capable of converting wind energy into heat, mechanical or electrical power.

Still another object of the invention is to provide a vertical rotational axis turbine motor having a plurality of airfoil propulsion vanes swivelably carried thereon to provide a rotational speed control for the turbine motor and prevents structural damage to the apparatus.

Other objects, features and advantages of the invention will be readily apparent from the following description of the several embodiments thereof, taken in conjunction with the accompanying drawings although other variations and modifications may be effected without departing from the spirit and scope of the novel concepts embodied in the disclosure, and in which:

DETAILED DESCRIPTION OF THE INVENTION

Figures 1, 2, 3, 4, 5:
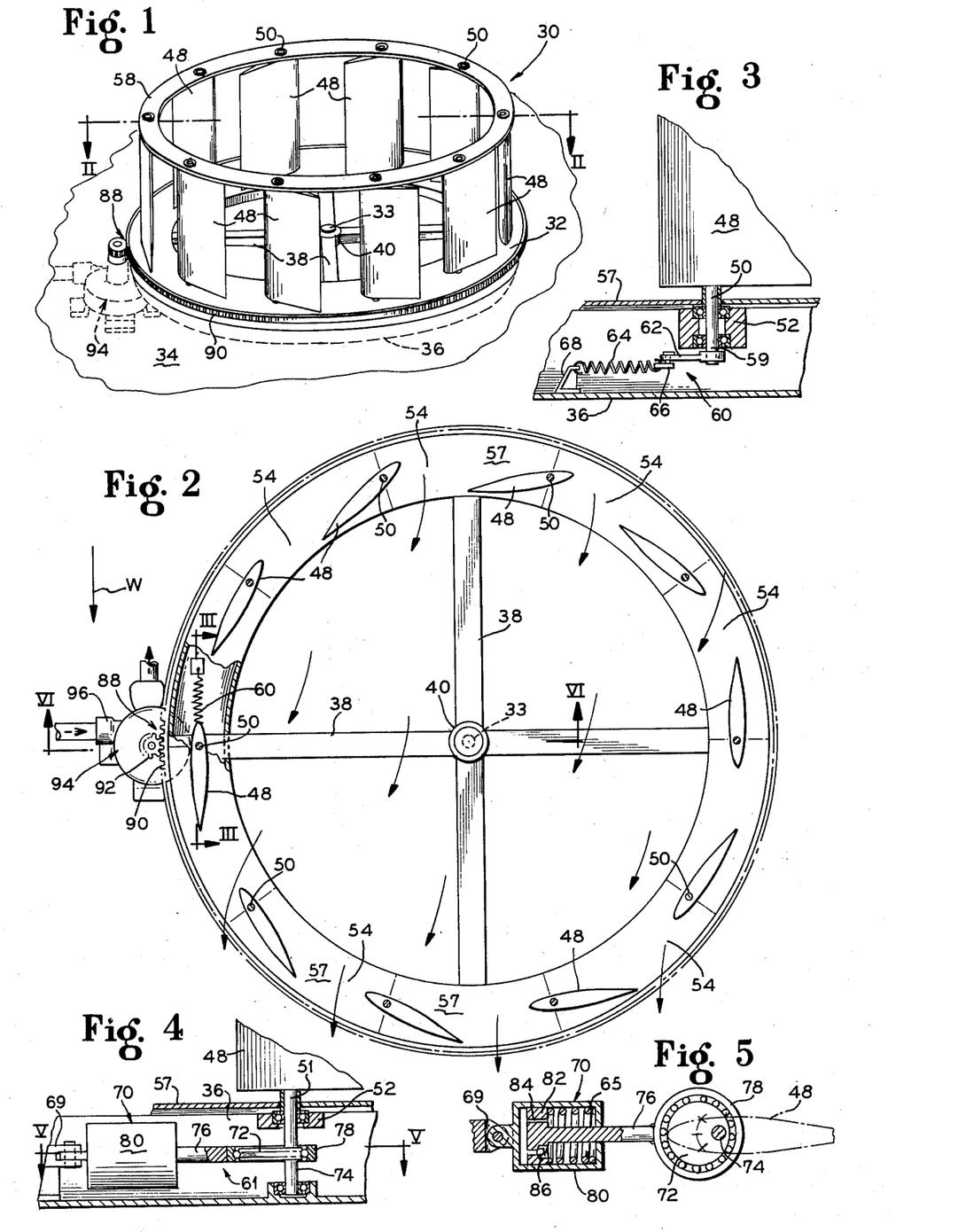
FIG. 1 is a perspective view showing a wind power turbine motor embodying features of the invention.
FIG. 2 is a sectional view taken generally along the line II—II of FIG. 1.
FIG. 3 is a fragmentary sectional view taken generally along the line III—III of FIG. 2 showing a feathering means incorporated with each vane assembly.
FIG. 4 is a view similar to FIG. 3, but showing an alternate feathering means for the vane assemblies.
FIG. 5 is a sectional view taken generally along the line V—V of FIG. 4.

FIG. 1 illustrates a large floating wind power conversion turbine motor 30 having a circular body 32 mounted for rotational movement about a center shaft 33 and supportably floating on a body of water 34. The circular rotary body 32 includes a ring-shaped, endless boat-like hull 36 being preferably toroidal or semi-toroidal in cross section and having a plurality of tie members 38 extending radially inward from said hull 36 and secured to a central hub 40. The hub 40 is rotatably supported on the center shaft 33 by means of a bearing 42 (FIG. 6).

Figure 6:
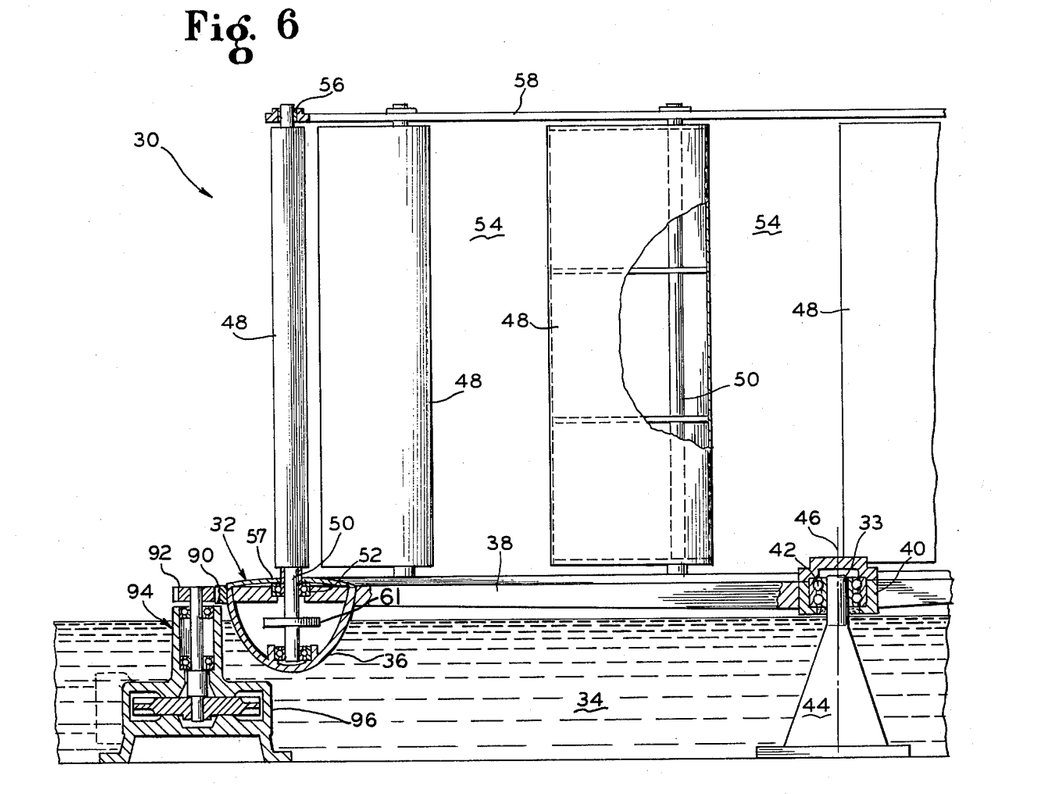
FIG. 6 is a fragmentary sectional view taken generally along the line VI—VI of FIG. 2 and showing a power take-off means driven by the turbine motor.

The center shaft 33 is shown in FIG. 6 as formed at the upstanding end of a center anchor 44 extending above the body of water 34 to provide a fixed rotating axis 46 about which the turbine motor 30 will rotate. As best seen in FIGS. 1 and 2, the circular body 32 carries a plurality of upward extending circumferentially spaced airfoil blades or propulsion vanes 48, each of which is supported on a pivotal mast 50 for 360° swingable movement about a bearing support means 52. The pivot masts 50 support the vanes 48 forward of the vane's center of pressure which in most airfoils is approximately 25% rearward of its leading edge and are balanced about their pivotal axes on the mast 50 so as to preclude their being influenced by centrifugal forces, especially when operating at higher circumferential speeds whereby weather vaning is only reflective of wind velocities and not influenced by "G" loadings. Each of the bearing support means 52 are secured at regularly spaced intervals to the boat-like hull 36 providing substantial circumferential spaces 54 between adjacent vanes 48. The upper end of each pivotal mast 50 is carried in a bearing 56 supported in a circular stabilizing ring 58 to generally distribute bending loads among the various masts. Alternatively, the upper end of the pivotal masts 50 may be individually braced, or in some instances, may be left free-standing.

The lower end 59 of each pivotal mast 50 extends downward of the bearing support means 52 into the boat-like hull 36 with an automatic feathering means 60 connected thereto. Covers 57 are provided to enclose the top of the boat-like hull 36 for the exclusion of water and to protect automatic feathering means 60. As best seen in FIG. 3, the automatic feathering means 60 consists of a centering arm 62, secured to the lower end 59 of the mast 50 and extends forward thereof in the direction of the turbine motor rotation. The centering arm 62 is held in this orientation by a tension spring 64 stretched between a swivel joint 66 connected at the forward end of the centering arm 62 and an anchor bracket 68 attached to the bottom of the boat-like hull. Thus, the propulsion vanes 48 are urged to a centered position, tangential to the path of rotation, by the feathering means 60 while allowing deflection to the leeward under wind loads. This limits the wind force applicable against the vanes to regulate the speed of the turbine motor 30 and protect the upstanding propulsion vanes against damaging gale forces. With gale force winds, the feathering means 60 allows the vanes to head straight into the wind, which will stop the rotation of the turbine motor and reduce the wind loads to a safe level and forestall damage to the unit.

Accordingly, the tension springs 64 are selected to yield proportionally to increased wind velocities to provide a generally constant controlled angle of attack to a relative wind vector and provide a predetermined maximum rotational speed (with appropriate constant wind speeds) to drive the turbine motor 30. Without the springs 64, the vanes 48 would all head into the wind and the turbine motor 30 would not turn.

It will be seen from FIG. 2 of the drawings that subjecting the vanes 48 to a given wind moving in the direction of the arrow W, the vanes moving along the windward side of the circular body 32 are deflected inward or toward the center shaft 33 and the vanes of the leeward side of the body 32 are deflected outward or away from the center shaft 33. The vanes moving parallel to the wind direction are centered or aligned tangential to the direction of rotation. Obviously, the degree of deflection of each vane rotating about the windward and leeward side of the circular body 32 is reflective of the wind load thereon and its position relative to the wind direction. In a light wind, the vanes would remain almost perpendicular to the radius throughout a full rotation, while in a strong wind, the vanes would weather-vane and produce comparatively little torque. Further, as seen in FIG. 2, the wind sweeping through the spaces 54 between the vanes on the windward side is somewhat deflected from its normal path and approaches the leeward side vanes through the center open area at a greater torque angle thereby providing an increased torque to enhance the rotational force capabilities of these vanes, especially at slower circumferential speeds.

In FIGS. 4 and 5, a modified automatic feathering means 61 is diagrammatically shown having a damping means 70 including therewith to restrain the vanes 48 when operating in higher wind conditions. Herein an eccentric 72 secured to the lower end 74 of a pivotal mast 51 for the vanes 48 is connected to piston rod 76 by means of a bearing ring 78. As the eccentric pivots in response to wind loads on the vane 48, the piston rod 76 is extensively withdrawn from a sealed fluid cylinder 80 secured to the hull 36 by an anchor bracket 69, against the bias of a centering spring 65 enclosed within the cylinder 80 and acting against a piston 82 attached to the piston rod 76. The piston 82 is provided with a metering orifice 84 which restricts the passage of hydraulic fluid enclosed in the cylinder 80 from the piston rod end of the cylinder to the anchor bracket end. A check valve 86 also located in the piston 82 allows a free flow of hydraulic fluid therethrough back to the piston rod end of the cylinder 80. Thus, the vanes are able to gradually increase their relative angle to the tangent and provide a more constant angle to the wind over a considerable range of wind velocities.

A power take-off driving means 88, formed around the rim of the circular body 32, is illustrated in FIGS. 1 and 2 as comprising a large ring gear 90 encircling the rim portion 91 of the body 32 and drivably engaging a pinion 92 of an energy absorption means 94. The energy absorption means 94 may be of any suitable form adapted to utilize the energy generated by the turbine motor 30. Since the wind powered turbine motor 30 operates throughout an extreme power range which is generally proportional to the wind velocity cubed, the energy absorption means 94 must be able to cope with large power fluctuations. A suitable "load match" may be achieved by providing multiple units which are clutched in and out to conform to power produced. However, a more practical application is to employ an energy absorption means in the form of a reentry "drag" turbine pump 96 used to heat water to produce thermo energy which is stored in an insulated tank (not shown) and utilized for heating purposes.

Figure 7:
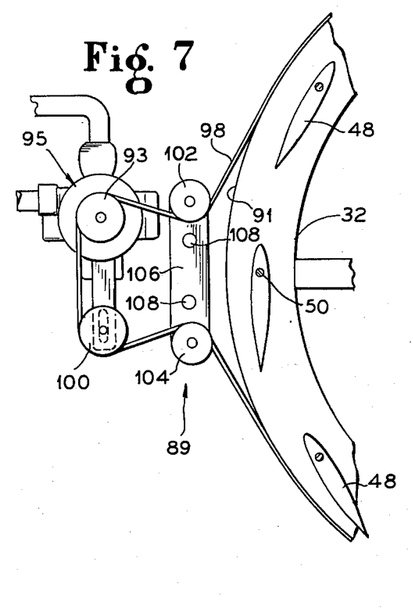
FIG. 7 is a fragmentary plan view showing an alternate form of power take-off means.
Figure 8:
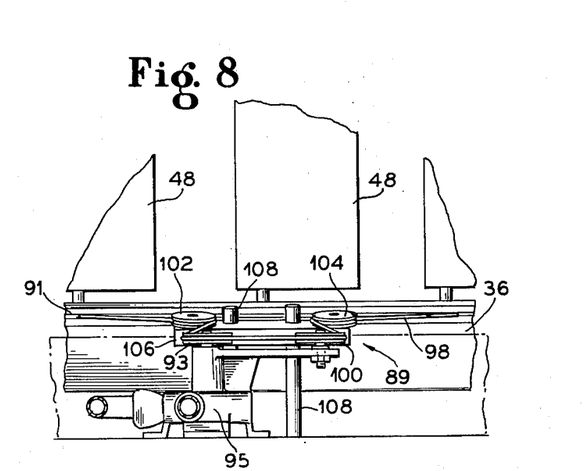
FIG. 8 is a side elevational view of the power take-off means shown in FIG. 7.

FIGS. 7 and 8 show a turbine motor 30 adapted to drive an energy absorption means 95 by means of a simplified power take-off means 89 well-suited to very large units. An endless cable belt 98 drivably engages a substantial portion of the rim 91 of the circular body 32 and extends about a drive sheave 93 of the energy absorption means 95. A take-up sheave 100 and a pair of guide sheaves 102 and 104 guide the cable belt 98 between the rim 91 and the drive sheave 93. The guide sheaves 102 and 104 are secured to a float 106 which is slidably mounted on guides 108 to provide a smooth transfer of the cable belt 98 from the rim 91 onto the drive sheave 93 and back onto the rim 91 of the floating boat-like hull 36 which may be subject to minor level fluctuations reflective of changes in the level of a large body of water upon which the hull 36 is supported.

Figure 9:
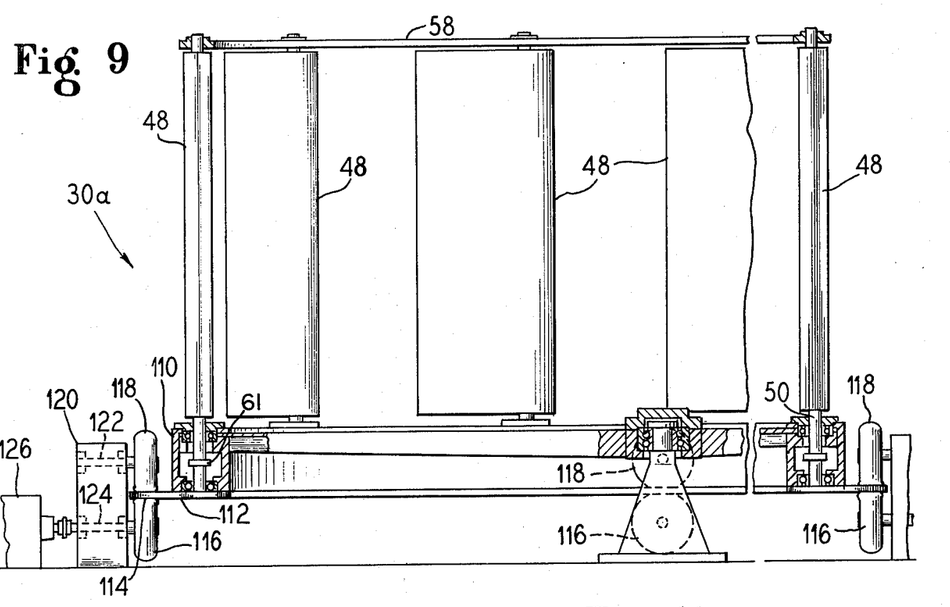
FIG. 9 is a view similar to FIG. 6, but showing an alternate supporting structure and power take-off means for the wind power conversion turbine motor.

FIG. 9 shows a wind-powered turbine motor 30a similar to the turbine motor 30 of FIG. 6, but adapted for land use.

A circular rotating body 110, having the upstanding propulsion vanes 48 supported thereon and mounted for rotation about a vertical axis similar to the embodiment described above, is provided with a drive ring 112 forming radially outward extending drive surfaces 114 for supportive engagement with a plurality of pneumatic tires 116 circumferentially spaced about the drive ring 112. A second pneumatic tire 118 is preferably positioned directly above each of the tires 116 to insure good frictional drive contact with the surfaces 114 and to provide a hold-down means to stabilize the turbine motor 30a. Each set of the tires 116 and 118 is rotatably carried by a ground-supported mount 120 on shafts 122, 124. At least one of the shafts 124 extends from the mount 120 for coupling connection with a suitable energy absorption means 126 to utilize the power produced by the turbine 30a.

Figure 10:
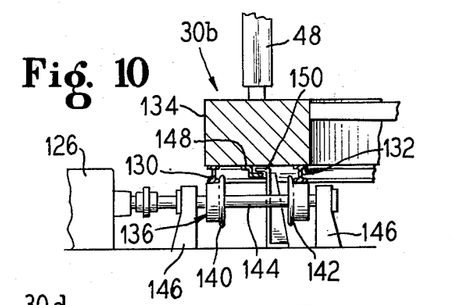
FIG. 10 is a fragmentary sectional view of another supporting structure for the turbine motor.

Another form of ground-supported turbine motor 30b, similar to the one shown in FIG. 9, is illustrated in FIG. 10 as having a pair of spaced full circle rails 130, 132 attached to the underside of a circular rotary body 134 and supported on a plurality of wheel sets 136 circumferentially spaced about the rotary body 134 of the turbine motor 30b. Each wheel set 136 comprises a pair fo flanged wheels 140, 142 carried on an axle 144 in spaced relationship relative to one another and conforming to the spacing of the rails 130, 132 to provide a rolling support therefor and as a power take-off means. Preferably, the wheel 140 will be constructed slightly larger in diameter than the wheel 142 whereby the lineal speeds of the wheels will be matched to the lineal speeds of rails. Alternately, only one of the flanged wheels may be keyed to the axle 144 with the other mounted for free wheeling relative to the axle. Herein, only one of the wheels turns the axle. Each end of the axle 144 is rotatably supported in a journal box or bolster 146 with one shaft end having a drive couple to a suitable energy absorbing means 126. A hold-down ring flange 148 is also secured to the underside of the circular rotary body 134 intermediate the rails 130, 132 and cooperates with a plurality of hold-down fingers 150 to hold the rails 130, 132 on the flanged wheels 140, 142 respectively against upward displacement of the rotary body 134 with excessive wind loads on the vanes 48.

Figure 11:
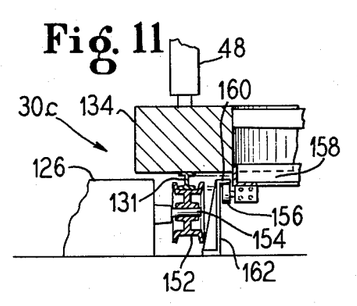
FIG. 11 is a fragmentary sectional view of still another supporting structure of the turbine motor.

FIG. 11 shows a ground support arrangement for a turbine motor 30c similar to FIG. 10 in which a single full circle rail 131 is attached to the underside of the circular rotary body 134 and is supported on a plurality of double-flanged wheels 152. At least one wheel 152 is carried on a shaft 154 extending from an energy absorbing means 126. A plurality of hold-down rollers 156 carried on a ring angle 158 attached to the rotary body 134, engages the underside of a hold-down ring flange 160. The hold-down ring flange 160 forms a continuous lip about the top of a hold-down frame 162 supported on the ground.

Figure 12:
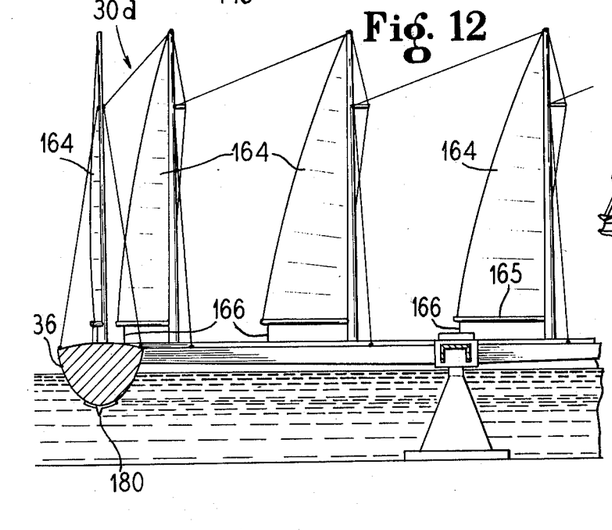
FIG. 12 is a view somewhat similar to FIG. 6, but shows an alternate form of wind intercepting means comprising sails to propel the turbine motor.

Still another form of turbine motor is shown in FIG. 12 in which the airfoil propulsion vanes 48 of the FIG. 6 embodiment are replaced by relatively standard sail boat rigging 164 with a sheet line 166 depending therefrom and reeved about a pair of sheaves 167, 168 and secured to an adjusting cap stand 170.

Figure 13:
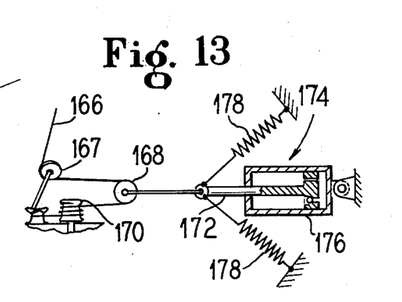
FIG. 13 is a diagrammatic view of a feathering means for the sails employed in FIG. 12.

The sheave 167 is tethered to a fixed object while the sheave 168 is attached to and moveable with a piston rod 172 of a feathering means 174. The feathering means 174 comprises an enclosed fluid cylinder 176 providing a damping arrangement similar to the damping means 70 shown in FIG. 5, but utilizing a pair of tension springs 178 to urge the battens 165 of the rigging 164 to a centered position by pulling in the sheet line 166. The check valve in the cylinder 176 allowing free inward movement of the piston rod 172 to shift the sheave 168 to the right as seen in FIG. 13, in a sheet line take-up direction. The circular boatlike hull 36 is shown in FIG. 12 to have a circular ice blade 180 attached to the bottom thereof to provide a skate blade arranged to support the turbine motor 30d on an ice surface in cold weather.

Figures 14, 15, 16, 17, 18, 19, 20:
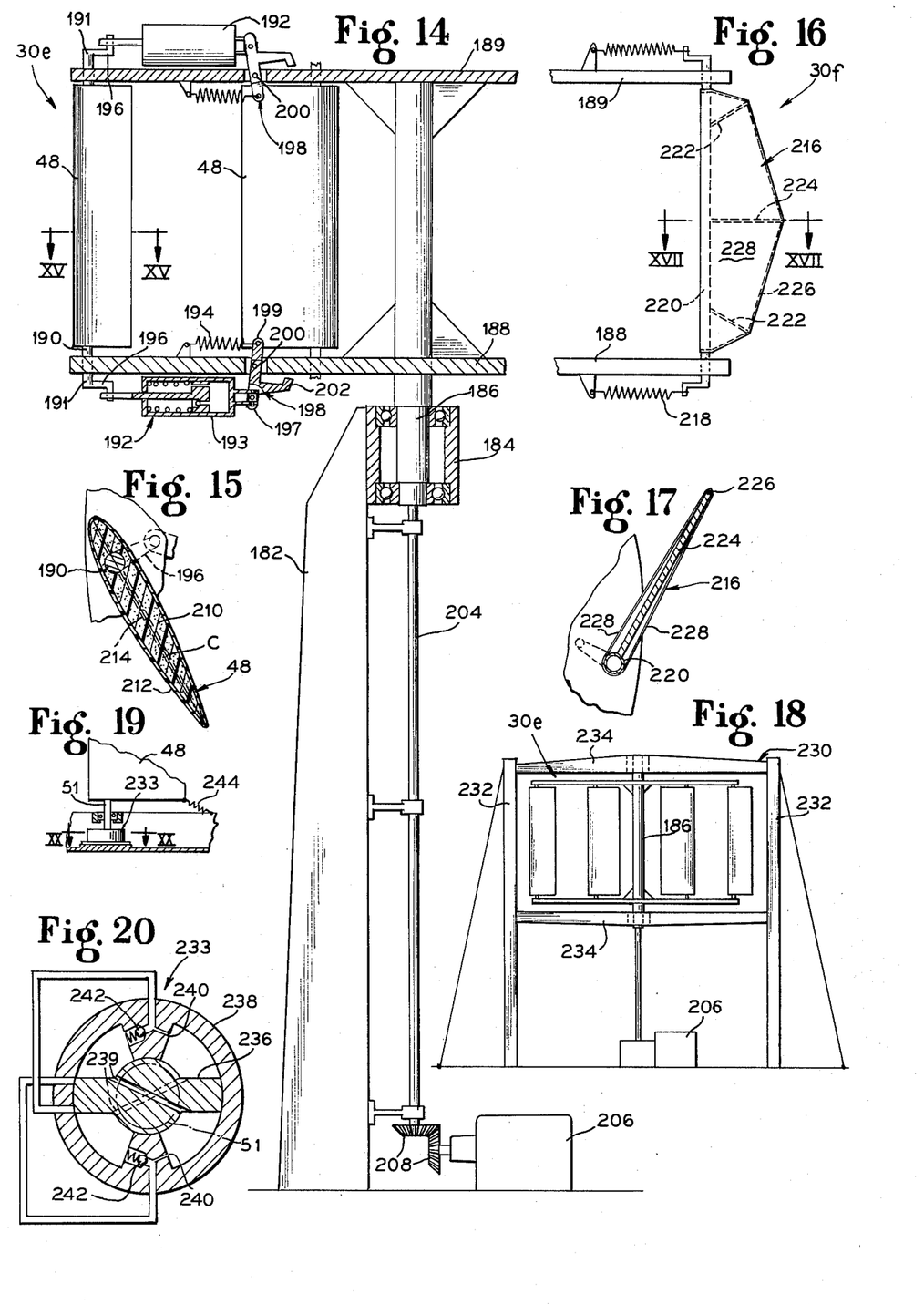
FIG. 14 is a fragmentary sectional view of yet another supporting structure in which the turbine motor is tower-mounted.
FIG. 15 is an enlarged fragmentary sectional view taken generally along the line XV—XV of FIG. 14 showing construction of the vane.
FIG. 16 is a fragmentary view of another form of vane adaptable for use with the structure of FIG. 14.
FIG. 17 is an enlarged fragmentary sectional view taken generally along the line XVII—XVII of FIG. 16 showing construction of the vane.
FIG. 18 is a side elevational view of another embodiment of a tower-mounted turbine motor.
FIG. 19 is a fragmentary sectional view of another feathering device for the vanes.
FIG. 20 is an enlarged sectional view taken generally along the line XX—XX of FIG. 19.

A relatively small and elevated turbine motor 30e is shown in FIG. 14 mounted at the top of a tower structure 182. A bearing means 184 rotatably supports a center shaft 186 therein with a lower frame 188 and a spaced upper frame 189 supported by the center shaft 186. Vanes 48 are swingably carried on shafts 190 between the spaced frames 188, 189 and circumferentially spaced relative to one another about the periphery of the frames. A feathering means 192 having a shock absorber damping means 193, similar to damping means 70 of FIG. 5, is operably connected to each end 191 of the shafts 190 by means of a crank arm 196.

The feathering means 192 utilizes a centering spring 194 to provide suitable vane response to wind loads encountered. The crank arms 196 extend at a right angle to a chord line "C" of the airfoil propulsion vanes 48 (as best seen in FIG. 15) and are urged radially inward toward the center shaft 186 by the centering springs 194. The damping means 193 provides an extensible shock-absorbing link between the crank arm 196 and one leg 197 of a pivot lever 198 which is carried by the frames 188, 189 on pivot pins 200. The centering spring 194 is secured to the leg 199 opposite the leg 197 of the pivot lever 198 and arranged to urge the pivot lever to a vertical position as set by a stop 202 to move the vanes 48 toward a tangential position relative to the circumference of the turbine. Thus, under wind loads, the vanes 48 are deflected leeward, as shown in FIG. 15 under the control of the damping means 193 and the centering springs 194.

The center shaft 186 carrying the frames 188, 189 and being rotatably driven by the torque developed by the propulsion vanes 48, is connected directly to a downward extending power take-off shaft 204. The shaft 204 is drivably coupled to an energy absorbing means 206 through a pair of bevel gears 208.

The propulsion vanes 48 are preferably metal foils for all weather operation and are uniform in section without twists or tapers and need not be built of expensive aircraft materials. They can be designed to operated in very high winds as well as low winds with at least three or more vanes used per installation. Although low-cost steel construction is well-suited to most service applications, any number of other materials may be equally well-suited for their construction, as for example as shown in FIG. 15, a light-weight plastic foam core 210 may be formed about the shaft 190 and covered by a tough, durable fiberglass skin 212. Lateral ribs 214 may be provided for strengthening the foam core 210. A ribbed frame covered by aluminum or plastic or fabric covering may be also be used with most turbine motors. (See FIG. 6).

In FIGS. 16 and 17, a simplified form of propulsive vane 216 feathering means 218 are shown for use with a turbine motor 30f, which is otherwise similar to the turbine motor 30e. Herein, a shaft or tube 220 provides a mount for the vane 216 between the lower and upper frames 188, 189 of the turbine motor 30f. A pair of spaced short-angled struts 222 and a center strut 224 project rearwardly from the shaft 220 and are interconnected by a wire 226 to stabilize their free ends and together with the shaft and struts form a light-weight frame about which a fabric or film covering is secured to provide the simple, two-sided, rigidified sail-like vane 216.

An alternate tower construction 230 for the turbine motor 30e provides a pair of guyed support poles 232 interconnected by a pair of cross beams 234 to support the center shaft 186 of the turbine motor.

Another form of damping means 233 is shown in FIGS. 19 and 20 which may be utilized on many of the turbine motor designs heretofore described, wherein gale force winds are not encountered and a full 360° swingable feathering movement of the vanes is unnecessary. Herein, the pivot mast 51, carrying the propulsion vanes 48, is secured to and supported by a rotary piston 236 enclosed in a fluid cylinder 238. The cylinder provides a metering shock absorbing fluid flow in a vane feathering direction through the passages 240 of the cylinder 238 and a free flow through check valves 242 for a return of the vanes to a centered position, responsive to the urging of the centering spring 244. Thus, hydraulic fluid in the cylinder 238 is metered from one side of the rotary piston 236 associated with pivoting of the vanes 48 in a leeward or feathring direction while the fluid is unrestricted when flowing in a direction for centering the vanes and accordingly, the piston 236 (as shown in FIG. 20). Crossover ports 239 permit free flow between connected chambers whereby they function as a single fluid chamber.

Figures 21, 22, 23:
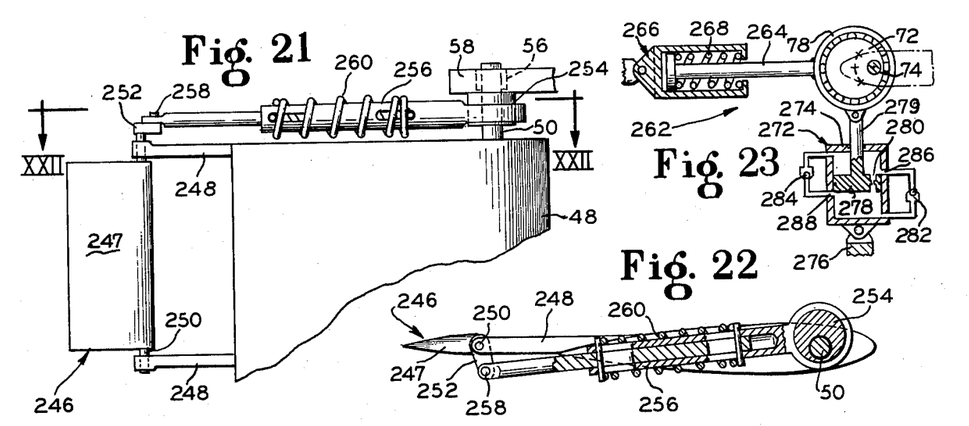
FIG. 21 is a fragmentary elevational view of still another form of feathering device applicable for use with the vanes of this invention.
FIG. 22 is a sectional view taken generally along the line XXII—XXII of FIG. 21.
FIG. 23 is a view similar to FIG. 5, but showing an alternate arrangement of the feathering means.

Propulsion vanes 48 which are supported on the circular body 32 in the manner heretofore described, may be positioned by a servo-foil means 246 which trims the torque angle of the vanes to optimize the output power of the turbine motor 30. As best seen in FIG. 21, the servo-foil means 246 includes a servo-flap 247 having a pivot shaft 250 extending therefrom for mounting the flap 247 between a pair of fixed arms 248 extending rearwardly from the upper trailing edge of the propulsion vane 48. The upper end of te shaft 250 is equipped with a short crank arm 252 extending radially inward toward the axis 46 of the turbine motor 30. The upper end of the pivot mast 50 is suitably retained in the bearing 56 of the stabilizing ring 58. An eccentric 254, depending from the stabilizing ring 58, has its center axis extending radially outward from the turbine axis 46. A control link 256, mounted on the fixed eccentric 254, angles across the top of the vane 48 and is connected to the crank arm 252 by means of a pin 258. The link 256 is extensively and contractively preloaded by a spring 260 to an intermediate length, as shown in FIG. 22. As the propulsion vane 48 swings leeward to a given angle responsive to wind loads, the servo-flap 247 swings further leeward as determined by the linkage arrangement, whereby the wind loads and air movements relative to the vane and the flap at a given position in rotation provide a stabilizing force to establish the operating angles of the vanes 48 at a generally optimum intercept angle relative to the wind vectors encountered. The preloaded spring 260 allows the link to extend or contract to feather the vanes when maximum operating wind velocity is encountered. When the wind velocity diminishes, the spring 260 restores the link 256 to its original intermediate length to increase the torque angle of the vane.

A feathering means 262, somewhat similar to the FIG. 5 embodiment, is shown in FIG. 23 for controlling the swinging movements of the vanes 48. Herein, the eccentric 72 which is secured to the lower end 74 of the pivotal mast 51 is connected to a rod 264 of a centering means 266 by means of bearing ring 78 carried on the eccentric 72. The rod 264 is biased by a centering spring 268 to urge te eccentric to a vane centering (tangential) position as shown in FIG. 23. A damping means 272 is connected to the bearing ring 78 perpendicular to the rod 264 attachment. The damping means 272 comprises a sealed fluid cylinder 274 secured to the turbine body an anchor bracket 276 and having a piston 278 enclosed within the cylinder 274 with a piston rod 279 extending therefrom and pivotally connected to the bearing ring 78. The piston is provided with a metering orifice 280 which restricts the passage of hydraulic fluid enclosed in the cylinder 274 between the piston rod end and the anchor bracket end of the cylinder when the piston is moving in a vane feathering direction.

A pair of fluid by-pass check valves 282 and 284 permit free passage of fluid between opposite ends of the cylinder when the piston 278 is urged in a vane centering direction. Access ports 286 and 288 to the check valves 282 and 284 are alternately blocked by the piston feathering movements in opposite directions so that only the check valve responsible for centering by-pass flow relative to the piston direction of travel is operable.

In this embodiment, it will be seen that the damping means 272 positioned at right angles to centering spring 268 provides a maximum linear movement of the piston 278 in response to initial swinging movements of the eccentric 72 about the mast lower end 74 and provides a most effective damping arrangement for the vanes 48.

Figure 24:
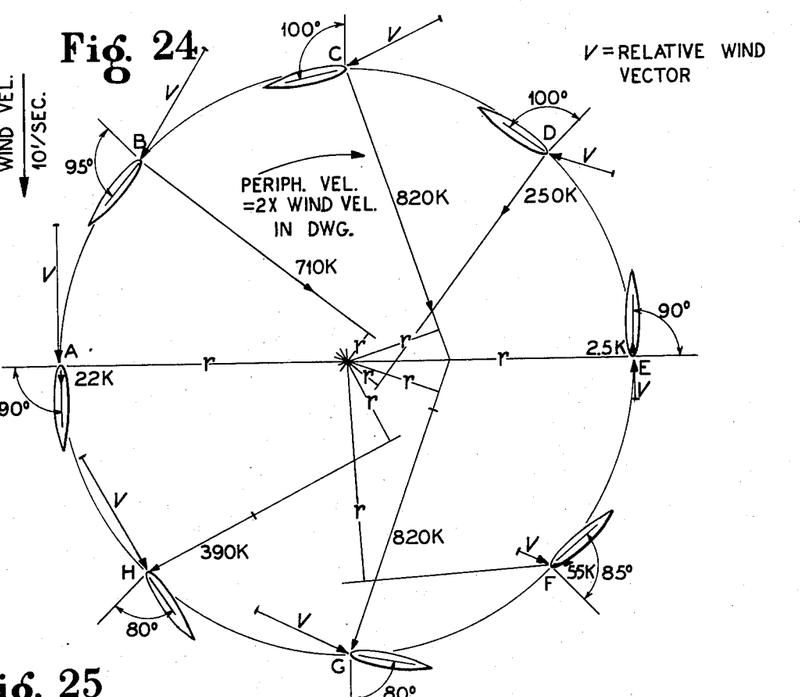
FIG. 24 is a diagrammatic plan view of a turbine motor constructed in accordance with the principles of the invention and showing a representative response of the vanes to a given wind velocity with resultant vector values plotted thereon.

Under the operating conditions shown in FIG. 24, the vanes are effective to impart varying torque influences on the tubine motor relative to individual rotational positions of the vanes. The resultant vector values and relative wind vectors are plotted for each of the vane positions shown on FIG. 24 A to H along with the assumed vane angles designated.

Figure 25:
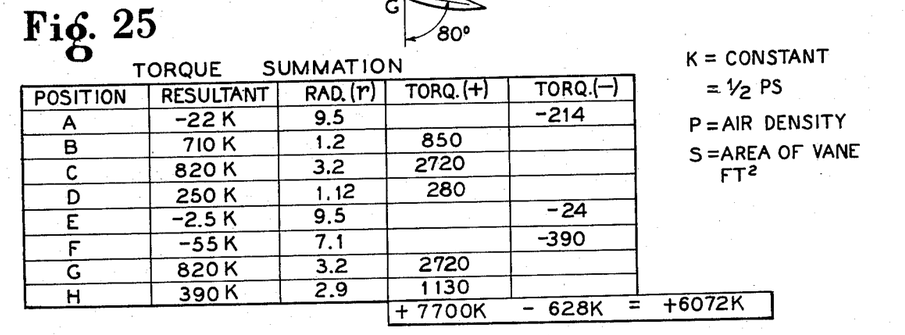
FIG. 25 is a table summarizing the torque values based on the vector values plotted in FIG. 24.

FIG. 25 summarizes the torque values relative to each of the positions shown in FIG. 24 with a substantial positive rotational torque indicated as produced by the present invention.

At position A, the vane heads directly into the wind and contributes a negative torque, but at position B, a positive torque has already materialized with a full maximum torque developed at the position C. At position D, the torque diminishes until at position E, the vane is moving dead before the wind and producing a small negative torque. At position F (the stall point), the center of pressure moves to the ½ chord point (midway between leading and trailing edges of vane) with a comparatively large negative torque produced. However, at positions G and H, the vanes are at a great enough angle to produce substatial positive torques.

Thus, it may be seen that power in the form of kinetic energy contained in a wind is extracted by each vane of the turbine motor in accordance with its relative position to the wind direction with power output of the turbine dependent not only on wind velocity, turbine size and rotational speeds, but also on the mechanical efficiencies of the support means and the power take-off arrangement utilized. It will also be recognized that the turbine motors accept wind from any direction and the power produced is available at ground level.

It will be understood that variations and modifications may be effected without departing from the spirit and scope of the novel concepts of this invention.

I claim as my invention:

1. A wind power conversion turbine comprising:
   a rotary body;
   means supporting said body for rotation about a vertical axis;
   a plurality of substantially upright propulsion vanes swingably carried by said body on individual axes substantially spaced from said vertical axis and circumferentially spaced from one another about an open space;
   said vanes having first generally radially outwardly facing surfaces and second generally radially inwardly facing surfaces, whereby the first surfaces propulsively intercept thrusting air on the windward side of said body and air passing between the spaced vanes and sweeping across the open space propulsively thrusts against said second surfaces of the vanes on the leeward side of the body, thereby converting wind energy into torsional force to drive the turbine rotatably about said vertical axis;
   feathering means urging the propulsion vanes into tangential positon relative to the circumference of the turbine while allowing deflection of the propulsion vanes to the leeward under wind loads to limit torque developed by said vanes to limit rotational speed of the turbine and to protect against damaging wind loads; and
   a shock absorbing means having one end thereof secured to said body and having a second end connected to a pivot means, said pivot means comprising the individual axis for said propulsion vanes, wherein said shock absorbing means is arranged to retard wind induced swinging movements of the vanes away from their tangential position as relative wind direction shifts through each revolution of the rotary body.

2. A wind power conversion turbine according to claim 1, wherein said shock absorbing means comprise a fluid filled cylinder, having a piston therein forming fluid chambers on opposite sides of said piston and having a metering passage and a check valve communicating between the chambers, wherein said metering passage provides a damping restrictive flow therethrough responsive to increasing wind loads on the propulsion vanes, and wherein the check valve freely passes fluid therethrough reponsive to decreasing wind loads on said vanes and upon urging by said feathering means for urging the propulsion vanes into tangential positions.

3. A wind power conversion turbine according to claim 2, wherein said means for urging the propulsion vanes into tangential positions comprise a spring means arranged to urge the piston to a vane centering position relative to the extensible shock absorbing means, said piston having a piston rod extending therefrom comprising said second end of the extensible shock absorbing means.

4. A wind power conversion turbine according to claim 3, wherein the piston rod of said extensible shock absorbing means connects to the pivot means by way of an eccentric interposed therebetween and secured to the pivot means, whereby swinging movements of the propulsion vane away from the tangential position produce movements of the piston relative to said cylinder with a corresponding damping restrictive fluid flow through said metering passage.

5. A wind power conversion turbine according to claim 1, wherein said rotary body comprises a circular, endless boat-like hull to operatively support the turbine on a body of water.

6. A wind power conversion turbine according to claim 5, wherein said boat-like hull is provided with a circular blade to support the turbine for operation on an ice surface.

7. A wind power conversion turbine according to claim 1, wherein said rotary body includes a circular drive ring for operatively supporting the turbine on a plurality of pneumatic tires whereby at least one of the tires serves as a power take-off means to drive an energy absorbing means.

8. A wind power conversion turbine according to claim 7, wherein each of the plurality of pneumatic tires has a cooperating hold-down pneumatic tire positioned directly thereabove and in spaced relationship thereto wherein the circular drive ring is carried between supporting and hold-down tires.

9. A wind power conversion turbine according to claim 1, wherein the rotary body is ground-supported on wheel and rail means and having hold-down means to prevent upward displacement of the rotary body.

10. A wind power conversion turbine according to claim 9, wherein said wheel and rail means comprise a plurality of spaced flanged wheels rotatably carried on a plurality of ground-supported axles, and a continuous circular rail secured to said rotary body and supported for rotational movement about the vertical axis of said turbine on said plurality of flanged wheels.

11. A wind power conversion turbine according to claim 10, wherein at least one of the plurality of ground-supported axles is operatively connected to an energy absorbing means.

12. A wind power cnversion turbine according to claim 11, wherein each of the plurality of ground-supported axles carries a pair of spaced flanged wheels with a pair of spaced circular rails secured to said rotary body and operatively supported on said pair of flanged wheels, and wherein the hold-down means comprise a flanged ring secured to the circular body and cooperating with a plurality of fingers to prevent upward displacement of the rotary body.

13. A wind power conversion turbine according to claim 11, wherein the plurality of spaced flanged wheels comprise double flanged wheels to support the turbine on the continuous circular rail, and wherein the hold-down means includes a ground-supported ring flange and a plurality of spaced hold-down rollers carried by the rotary frame and engaging an underside of the ring flange to prevent upward displacement of the rotary body.

14. A wind power conversion turbine according to claim 1, wherein the rotary body of said turbine is arranged to drive an energy absorption means through power take-off means connected between the energy absorbing means and a rim portion of the rotary body.

15. A wind power conversion turbine according to claim 14, wherein said power take-off means includes a gear means formed about the rim portion of the rotary body and drivably engaging a gear means carried by said energy absorbing means.

16. A wind power conversion turbine according to claim 14, wherein said power take-off means includes an endless cable belt drivably engaging a substantial rim portion of said rotary body and being drivably connected to a drive sheave carried by said energy absorbing means.

17. A wind power conversion turbine according to claim 2, wherein a tower structure supports said body for rotation bout an elevated vertical axis, and wherein said rotary body comprises a pair of spaced frames interconnected by a center shaft and having a power take-off shaft extending downward from said center shaft to drive a ground-supported energy absorbing means and with said plurality of propulsion vanes carried between the spaced frames on said pivot means.

18. A wind power conversion turbine according to claim 17, wherein a crank arm formed at an end of the pivot means connects to the piston rod of said extensible shock absorbing means, and a first end of a pivot lever connects the cylinder of said shock absorbing means to said body on a pivot pin intermediate said first end of the pivot lever and a second end thereof for operative control of said propulsion vanes, and wherein said means for urging the propulsion vanes into tangential position comprise a pair of springs with a first spring arranged to urge the piston to a fully retracted position relative to the extensible shock absorbing means and with a second spring connected to said second end of said pivot lever, whereby leeward deflection of the vanes is under the control of the pair of springs for maximum response to wind loads.

19. A wind power conversion turbine according to claim 1, wherein said propulsion vanes comprise uniform section air foils having a light-weight plastic foam core and a fiberglass skin covering.

20. A wind power conversion turbine according to claim 1, wherein said propulsion vanes comprise uniform section air foils having a ribbed frame and a sheet covering.

21. A wind power conversion turbine according to claim 1, wherein said propulsion vanes comprise relatively standard sail boat rigging.

22. A wind power conversion turbine according to claim 1, wherein said means for controlling the swinging movements of the vanes comprise servo-foils pivotally carried by each of the propulsion vanes, spaced rearwardly of the vane's trailing edge and being pivotally cross-connected to the rotary body by a control link, whereby each vane and its related servo-foil are aligned with one another when at a tangential position relative to the circumference of the turbine and whereby swinging angular movement of the vane and servo-foil to leeward under wind load, causes said servo-foil to swing at a proportionally greater angle than said vane to maintain said vane at a generally optimum angle relative to wind vectors associated with each vane.

23. A wind power conversion turbine according to claim 22, wherein said control link is resiliently extensible and retractable allowing feathering of the vanes under excessive wind loads.

24. A wind power conversion turbine, comprising: a rotary body; means supporting said body for rotation about a vertical axis; a plurality of substantially upright propulsion vanes swingably carried by said rotary body on individual swing axes equally spaced from one another about the circumference of the rotary body, said vanes having wind intercepting surfaces thereon to convert wind energy into torsional force to drive the rotary body about said vertical axis and provide output torque for said turbine; and means for controlling the swinging movements of the vanes including a feathering means allowing deflection of the propulsion vanes to the leeward under wind loads and a shock absorbing means arranged to retard wind induced deflection of the propulsion vanes at an appropriate rate whereby the vanes are regulated to provide a generally optimum wind intercepting angle in accordance with each vane's position of rotation and through a wide range of wind velocities.

25. A wind power conversion turbine according to claim 24, wherein said feathering means comprises a spring biasing means arranged to urge the propulsion vanes into tangential positions relative to the circumference of the turbine and wherein said shock absorbing means is arranged to control deflection of the propulsion vanes away from said tangential positions to provide a generally uniform, maximum level of power output for the turbine while maintaining safe wind loading of the propulsion vanes throughout a wide range of wind velocities.

26. A wind power conversion turbine according to claim 24, wherein said shock absorbing means regulates the vanes to gradually increase their angles of deflection relative to the tangential position under suitable wind loads through a certain range of rotary positions.

27. A wind power conversion turbine according to claim 25, wherein said means supporting said body for rotation about a vertical axis comprises a tower structure, and wherein said rotary body comprises a pair of spaced frames interconnected by a center shaft and having a power take-off shaft extending downward from said center shaft to drive ground-supported energy absorbing means and with said plurality of propulsion vanes carried between the spaced frames on said individual swing axes.

28. A wind power conversion turbine according to claim 26 wherein said shock absorbing means comprise a fluid filled cylinder, having a piston therein forming fluid chambers on opposite sides of said piston and having a mastering passage and a check valve communicating between the chambers, wherein said metering passage provides a damping restrictive flow therethrough responsive to increasing wind loads on the propulsion vanes, and wherein the check valve freely passes fluid therethrough responsive to decreasing wind loads on said vanes and upon urging by said spring biasing means for urging the propulsion vanes into tangential positions.

* * * * *